Figure 1:
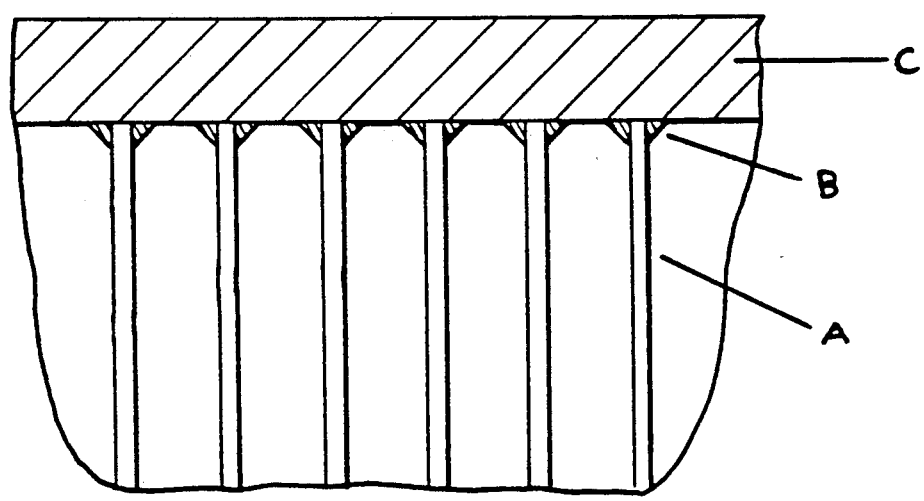

United States Patent [19]
Kasper et al.

[11] Patent Number: 5,087,500
[45] Date of Patent: Feb. 11, 1992

[54] MULTILAYER PANEL

[75] Inventors: Dietmar Kasper, Ludwigshafen; Herbert Woltron, Worms; Guenter Kreibiehl, Ludwigshafen; Ulrich Eichenauer, Frankfurt; Norbert Becker, Neuhofen, all of Fed. Rep. of Germany

[73] Assignee: BASF Aktiengesellschaft, Ludwigshafen, Fed. Rep. of Germany

[21] Appl. No.: 500,648

[22] Filed: Mar. 28, 1990

[30] Foreign Application Priority Data

Mar. 28, 1989 [DE] Fed. Rep. of Germany ....... 3910021
Jun. 16, 1989 [DE] Fed. Rep. of Germany ....... 3919657

[51] Int. Cl.$^5$ .................................................. B32B 3/26
[52] U.S. Cl. ...................................... 428/116; 156/196; 428/119; 428/317.1; 428/317.7; 428/319.7

[58] Field of Search .............. 428/116, 119, 317.1, 428/317.7, 319.3, 319.7; 156/196

[56] References Cited

U.S. PATENT DOCUMENTS

| | | | |
|---|---|---|---|
| 3,484,335 | 12/1969 | Wismer et al. | 428/319.3 |
| 3,656,992 | 4/1972 | Lynam et al. | 427/284 |

FOREIGN PATENT DOCUMENTS 1467766   3/1977   United Kingdom ............ 428/319.3

Primary Examiner—William J. Van Balen
Attorney, Agent, or Firm—William G. Conger

[57] ABSTRACT

In a multilayer panel comprising a core layer A with a honeycomb structure or an open-celled foam structure and at least one cover layer C made of a fiber-reinforced thermoplastic polymer, layers A and C are bonded to one another by an adhesive B which is a thermoplastic polymer.

6 Claims, 2 Drawing Sheets

MULTILAYER PANEL

BACKGROUND OF THE INVENTION

1. Field of the Invention

The present invention relates to a multilayer panel comprising a core layer A having a honeycomb structure or an open-celled foam structure and at least one cover layer C made of a fiber-reinforced thermoplastic polymer, wherein said layers A and C are bonded to each other by an adhesive B which is a thermoplastic polymer.

Owing to new fire protection requirements governing the interior trim of aircraft, there is an increasing demand for high-strength, high stiffness, multilayer panels having polymeric matrix.

2. Description of the Related Art

Multilayer panels composed of a core layer having a honeycomb structure and cover layers made of thermoset polymers are known. The bond between the layers is customarily due to a liquid adhesive which is applied to the cover layers or due to an adhesive film. In either case the adhesive is preferably an epoxy resin with or without slight incipient polymerization.

DE-A-2 009 090 (U.S. Pat. No. 3,656,992) recommends that core layers having a cell structure and porous cover sheets should be bonded together using perforated adhesive films which preferably consist of a heat-curable epoxy resin which may contain a thermoplastic polymer in admixture. As the resin is heated and cured, bulges of adhesive develop at the points of contact between the cover sheets and the edges of the cell structure cores, which is said to bring about good adhesion.

However, multilayer panels based on thermosets do not have a sufficiently low flammability rating for many purposes, in particular for aircraft interiors. In addition, the strength and stiffness and the moisture gain of prior art multilayer panels leaves something to be desired.

OBJECTS OF THE INVENTION

It is an object of the present invention to provide multilayer panels having excellent mechanical properties, a sufficiently low flammability rating and a low moisture gain and also good interlayer adhesion.

We have found that this object is achieved by the multilayer panel according to the present invention.

Core layer A has a honeycomb structure or preferably an open-celled foam structure. The preferred material for the honeycombs is polymer-coated NOMEX paper, but it is also possible to use aluminum or a plastic material, in particular a temperature-resistant thermoplastic material. Open-celled foams can consist for example of polyether sulfone or of a melamine/formaldehyde polycondensate. The thickness of the core layer may range from 3 mm to 100 mm.

Cover layer C is a fiber-reinforced thermoplastic, preferably temperature-resistant, material, for example a polyether sulfone, polyether ketone, polyphenylene sulfide, polyimide or polyamide. The fiber content is preferably from 40 to 70% by volume. The fibers can be for example glass, carbon or aromatic polyamide fibers, which may be present in oriented or fabric form. The cover layer is in general from 0.1 to 1 mm in thickness.

Adhesive B is a thermoplastic, preferably temperature-resistant, material, preferably one of the above-mentioned polymers. It must be compatible with the polymer of cover layer C; preferably, the two layers are made of the same polymer.

In a preferred embodiment of the multilayer panel according to the present invention, adhesive B has only been applied at the contact lines between the cell walls of core layer A and cover layer C. This ensures that the bond is obtained with the minimum amount of material.

In this embodiment, adhesive B is advantageously applied to the end face of a core layer in the form of a solution or as a melt. This can be done by dipping, knifecoating or roller coating, preferably with the aid of a calendering unit. In the course of the application of adhesive, the outer edges of the cell walls develop a meniscus. Any solvent used is evaporated; the cover layer and the adhesive-treated core layer are then pressed together. FIG. 1 is a schematic of this embodiment.

In another embodiment, adhesive B is present as an adhesive film and thus forms a bond with cover layer C over the whole area.

In either embodiment of the present invention, the layers must be bonded to one another. This is done at elevated temperatures by melting the thermoplastic polymer of adhesive B or at least softening it to such an extent that it will form an adhesive bond with layers A and C.

Figure 2:
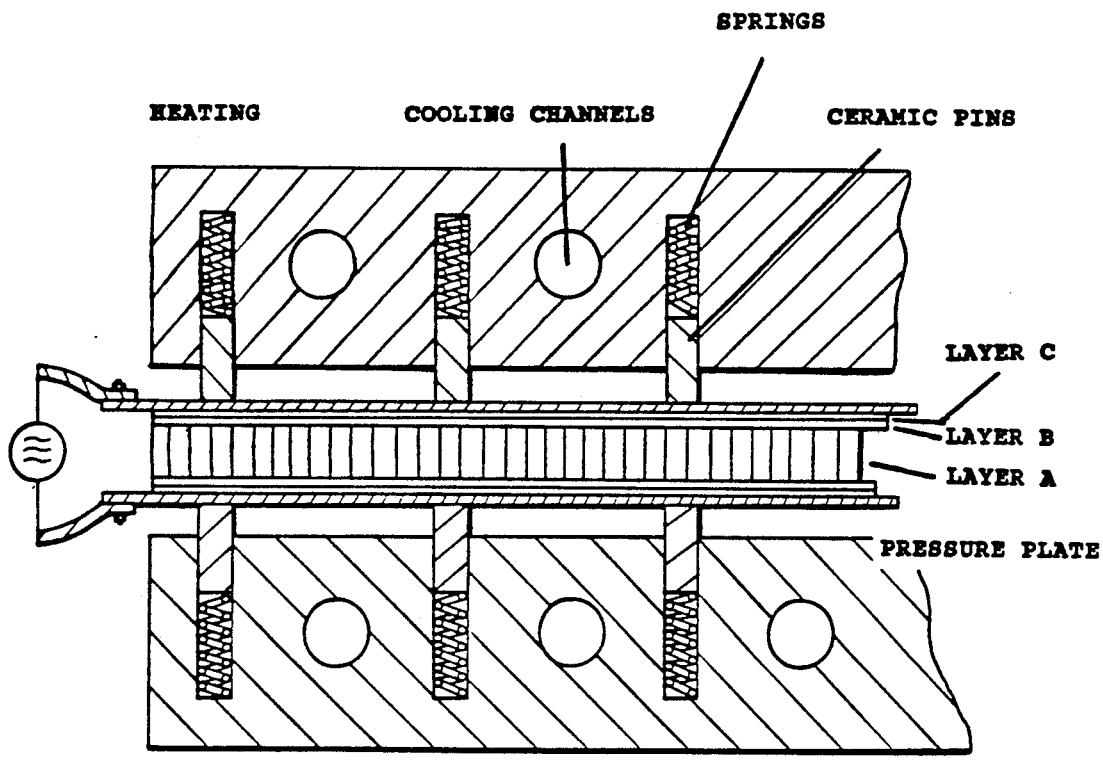

In a preferred embodiment of the process of producing the multilayer panel, the trimmed layers are placed between two thin, low-mass hotplates of a resistance heater, heated, pressed and cooled (FIG. 2).

These plates are electrically insulated from the press platens of the clamping unit by insulators, preferably by ceramic pins. Compression springs provide an elastic connection between the insulators and the press platens.

In detail, the process according to the present invention is carried out as follows:

The layers are placed on the lower hotplate of the open clamping unit.

The clamping unit is closed to such an extent that, via the compression springs, the insulators exert sufficient pressure on the hotplates and hence on the laminate during heating up. This ensures very good heat transfer (by heat conduction) from the hotplates to the laminate.

In this position of the clamping unit the electric resistance heater is activated. The laminated temperature is measured by thermocouples incorporated in the hotplates.

Figure 3:
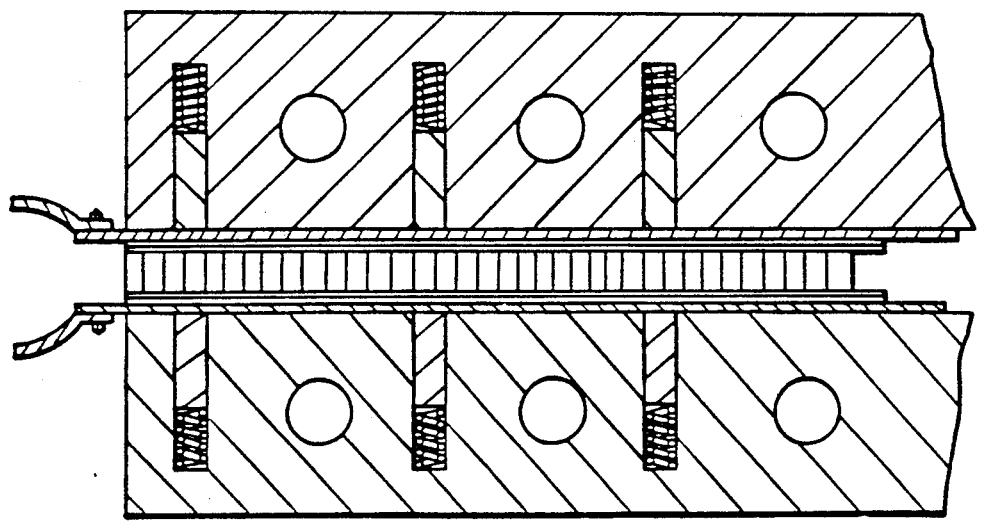

After the processing temperature of the molding compound has been reached, the electric heater is switched off and the clamping unit moved to the required distances in the tool (FIG. 3). The distances serve to set the component thickness.

In this phase the hot cover layers become pressed and bonded to the core material. At the same time the heat passes from the hotplates into the cooled tool platens.

The cooling process in general takes from 20 seconds to 5 minutes, preferably from 30 seconds to 2 minutes. Once the predetermined final temperature has been reached, the multilayer panel can be demolded.

This process operates at low voltage and high current strength. The voltage can be chosen within the range from 5 to 15 volts per linear meter of hotplate length. The current strength is dependent on the hotplate width and thickness. For a 1.2 mm thick hotplate it is within the range from 3000 to 10,000 amperes per meter of hotplate width.

Since this process utilizes only very thin hotplates, preferably from 0.5 to 5 mm in thickness, especially from 0.7 to 2 mm in thickness, the energy required for heating up the laminates can be applied very rapidly and also be reduced to a minimum.

It is a further advantage of the process according to the present invention that the use of thin hot plates of low mass ensures a very high cooling rate, so that short overall cycle times become possible.

It is another advantage that the trimmed molding compounds can be introduced into a cold tool. In addition, introduction into a cold tool has the advantage that the heat input into the molding compound—once the resistance heater has been activated—takes place simultaneously from above and below.

From an energy aspect this process represents a very advantageous solution compared with existing compression molding processes since the high temperatures required are obtainable with a very low energy input per press cycle.

In another, continuous embodiment the layers are introduced into a double belt press comprising a heating and a cooling zone. They are first heated therein, pressed and then cooled.

The multilayer panels according to the present invention are suitable in particular for the interior equipment of aircraft, for example as floorpanels. However, they can also be used in automotive construction or machine tool engineering.

EXAMPLE

A multilayer panel measuring 500×700 mm is prepared from the following layers:

Core layer A: honeycomb of NOMEX ® paper, 8.8 mm thick

Adhesive layer B: polysulfone ULTRASON ® S 2000, 0.15 mm thick

Cover layer C: polysulfone matrix with 50% by volume of glass fiber fabric, 0.25 mm thick A core layer is compression-molded with 2 adhesive and cover layers at a time in a tool as shown in FIG. 2. Voltage: 10 volt, current strength: 3000 ampere, heating time: 1.5 min, cooling time: 1 min, processing temperature: 280° C.

We claim:

1. A multilayer panel comprising a core layer A with a honeycomb structure or a foam structure and at least one cover layer C made of a fiber-reinforced thermoplastic, wherein the layers A and C are bonded toe ach other by an adhesive B which is compatible with the thermoplastic of layer C.

2. A multilayer panel as claimed in claim 1, wherein the adhesive B has only been applied at the contact lines between cover layer C and the cell walls of cover layer A.

3. A multilayer panel as claimed in claim 1, wherein adhesive B is an adhesive film.

4. A multilayer panel as claimed in claim 1, wherein the thermoplasic is a temperature-resistant thermoplastic, preferably a polyether sulfone, polyether ketone, polyphenylene sulfide, polyamide or polyimide.

5. A process for producing the multilayer panel of claim 1, which comprises placing the layers between two thin, low-mass hotplates of a resistance heater, heating, pressing, and cooling for a cooling time of a few seconds.

6. A process for producing the multilayer panel of claim 1, wherein the layers are heated in a hot double belt press, pressed together and then cooled.

* * * * *